(12) United States Patent
Ahn

(10) Patent No.: US 8,027,773 B2
(45) Date of Patent: Sep. 27, 2011

(54) METHODS AND SYSTEMS FOR AUTOMATED CONTROL OF VEHICLE BRAKING

(75) Inventor: Samuel S. Ahn, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 728 days.

(21) Appl. No.: 11/891,427

(22) Filed: Aug. 10, 2007

(65) Prior Publication Data
US 2009/0043470 A1   Feb. 12, 2009

(51) Int. Cl.
G08G 1/16 (2006.01)
B60T 8/24 (2006.01)

(52) U.S. Cl. .......................... 701/70; 701/301

(58) Field of Classification Search ............... 701/70
See application file for complete search history.

(56) References Cited

U.S. PATENT DOCUMENTS

| | | | |
|---|---|---|---|
| 5,113,721 A | 5/1992 | Polly | |
| 5,128,869 A | 7/1992 | Akishino et al. | |
| 5,924,508 A * | 7/1999 | Clauss et al. | 180/179 |
| 6,076,899 A * | 6/2000 | Isella | 303/152 |
| 6,085,137 A | 7/2000 | Aruga et al. | |
| 6,367,322 B1 * | 4/2002 | Rump | 303/114.3 |
| 6,507,781 B2 * | 1/2003 | Maruko et al. | 701/70 |
| 6,719,076 B1 | 4/2004 | Tabata et al. | |
| 6,827,167 B2 | 12/2004 | Cikanek et al. | |
| 7,139,650 B2 * | 11/2006 | Lubischer | 701/48 |
| 2001/0027367 A1 * | 10/2001 | Maruko et al. | 701/70 |
| 2002/0091478 A1 * | 7/2002 | Tamura et al. | 701/70 |
| 2003/0183431 A1 | 10/2003 | Cikanek et al. | |
| 2004/0199319 A1 * | 10/2004 | Lubischer | 701/48 |
| 2005/0071071 A1 | 3/2005 | Nagata | |
| 2005/0184529 A1 | 8/2005 | Ueda | |
| 2006/0131085 A1 | 6/2006 | Tamai | |
| 2007/0131468 A1 * | 6/2007 | Bullinger et al. | 180/282 |
| 2008/0033622 A1 * | 2/2008 | Groitzsch et al. | 701/70 |

* cited by examiner

*Primary Examiner* — Shelley Chen
(74) *Attorney, Agent, or Firm* — Dinsmore & Shohl LLP

(57) ABSTRACT

Method and systems for automated anticipatory braking of a vehicle are provided. In one embodiment, the system comprises a vehicle accelerator movable between a maximum speed position and a minimum speed position, and a sensor configured to determine the rate of travel of the accelerator toward the minimum speed position. The system further comprises a controller configured to utilize the rate of travel of the accelerator to determine if a rapid braking condition is desired, and to provide a control signal to apply increased negative torque to the drive wheels of the vehicle prior to the user applying the vehicle brake. In some embodiments, driver history and/or other vehicle conditions are taken into account. In some embodiments, negative torque is applied via varying of valve timing, control of combustion chamber intake, control of exhaust backpressure, control of motor energy, and/or shifting of a transmission to a numerically higher speed ratio.

20 Claims, 2 Drawing Sheets

METHODS AND SYSTEMS FOR AUTOMATED CONTROL OF VEHICLE BRAKING

TECHNICAL FIELD

The present invention relates generally to methods and systems for control of vehicle braking, and in one embodiment, to a method for automated control of vehicle braking which includes monitoring an accelerator.

BACKGROUND

Current systems for decelerating a vehicle include wheel braking. Wheel braking is achieved by using friction to convert the kinetic energy of the rotating components of the vehicle to thermal energy which is dissipated to the environment. However, when the driver of the vehicle requires immediate deceleration, the driver typically must first reduce pressure on the accelerator pedal and move the foot to the brake pedal, then depress the brake pedal. This delay can be very significant in determining whether the vehicle is able to stop in time.

Another method of deceleration is via motor braking, where the vehicle decelerates during standard operation by way of the coupling between the motor and the drive wheels. This coupling may or may not include a discrete ratio or continuously-variable transmission. Motor braking may occur from via the internal-combustion engine, through friction and pumping losses, and/or an electric motor/generator in power generation mode.

During such braking which can occur during regular operation, some control systems may inhibit the transmission from shifting to a numerically lower speed ratio. However, this may not provide any substantial reduction in speed, especially if the transmission is already at a numerically lower speed ratio (which is typical when the vehicle is simply cruising at speed). In addition, some control methods can command a shift to a numerically higher speed ratio if a brake input is given from the driver under certain conditions and/or is higher than a predetermined threshold, or if other on-board vehicle systems detect an imminent crash event. However, with such systems, if the vehicle is in motion with an automatic transmission in a numerically lower speed ratio (such as overdrive) and/or an electric motor/generator is not in power generation mode, then the vehicle will initially offer little brake force in the form of motor-braking in between the time when the driver rapidly releases the accelerator and then applies pressure to the brake pedal.

Some control systems can detect that the accelerator pedal is no longer depressed and actuate a brake in response thereto. However, such systems can inaccurately and inefficiently brake the vehicle, and can cause the vehicle to brake even when braking was not intended. Moreover, such systems can cause undue wear to the brake system, and can require significant additional components or costs. In addition, such systems can have other disadvantages. For example, if the friction elements are wet (from rain, snow, etc.) the initial response/capacity may be slower or lower. Moreover, the friction elements may have diminished braking capacity (brake "fade", boiled brake fluid, etc.) from prior use (such as braking while traveling downhill.) In addition, the friction elements are maintenance items which need periodic replacement; if the parts are near the end of their life they may not have adequate brake response and capacity.

In such instances, the vehicle may not be providing substantial and efficient deceleration at the earliest correct indication of the driver's intent to decelerate the vehicle. The delay and/or other shortcomings associated with other methods and systems can be very significant in adequately and efficiently braking the vehicle. Accordingly, improved methods and systems are desired for providing automated control of vehicle braking.

SUMMARY

In one embodiment, the system comprises a vehicle accelerator movable between a maximum speed position and a minimum speed position, a vehicle brake, and a sensor configured to determine the rate of travel of the accelerator toward the minimum speed position. The system further comprises a controller configured to utilize the rate of travel of the accelerator to determine if a rapid braking condition is desired, and to provide a control signal to apply negative torque to the drive wheels of the vehicle prior to the user applying the friction brakes of the vehicle. The system also comprises a vehicle component configured to affect the torque on the drive wheels and to apply negative torque to the drive wheels in response to the signal. In some embodiments, driver history and/or other vehicle conditions are taken into account in determining if the rate of travel of the accelerator indicates that a rapid braking condition is desired. In some embodiments, negative torque is applied via varying of valve timing, control of combustion chamber intake, control of exhaust backpressure, control of motor energy, and/or shifting of a transmission to a numerically higher speed ratio.

In another embodiment, a system is provided for automated braking of a vehicle. The system comprises a sensor configured to determine at least one of position and rate of movement of a driver accelerator, and a controller. The controller in communication with the sensor and configured to generate a control signal configured to apply negative torque to the drive wheels of a vehicle in response to a predetermined high rate of movement of a driver accelerator control in a decreased speed direction of the vehicle accelerator.

In one embodiment, a method for automated braking of a vehicle is provided. The method comprises monitoring the rate of travel of an accelerator pedal in a deceleration direction, and determining if the rate of travel surpasses a threshold level. If the threshold level is surpassed, the method comprises braking the motor vehicle by controlling the negative torque on the drive wheels of the vehicle.

BRIEF DESCRIPTION OF THE DRAWINGS

It is believed that the following description of examples of embodiments will be better understood when taken in conjunction with the accompanying illustrative drawings in which.

Figure 1:
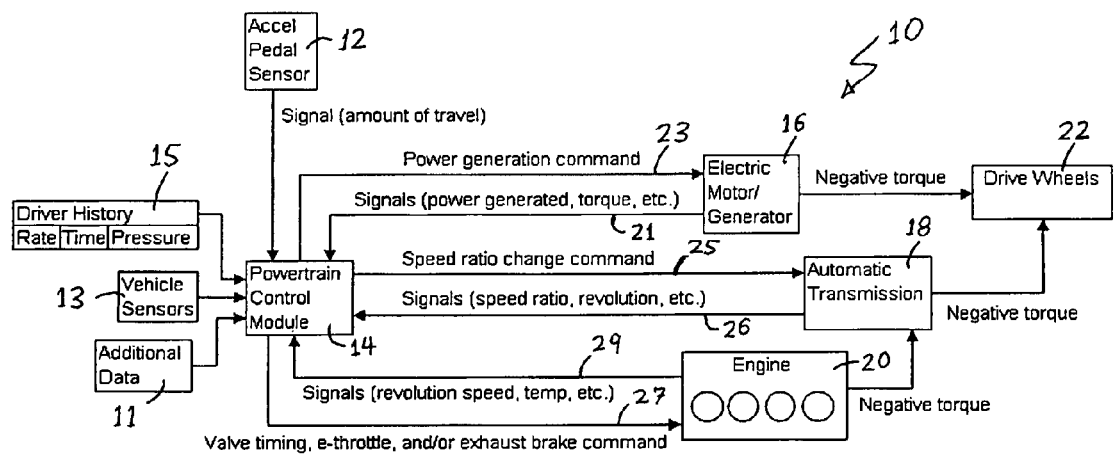
FIG. 1 is a schematic diagram illustrating a system for automated vehicle braking, according to one example of an embodiment of the present invention.

The embodiments set forth in the drawings and description below are illustrative in nature and are not intended to be limiting of the invention defined by the claims. Moreover, individual features of the drawings and the inventions will be more fully apparent and understood in view of the detailed description of examples.

DETAILED DESCRIPTION OF ILLUSTRATIVE EMBODIMENTS

In general, embodiments relate to determining the rate of travel of a vehicle accelerator in a deceleration or slowing direction and to the application of negative torque on the drive wheels depending on the rate of travel. Application of negative torque can be accomplished in a variety of ways such as via controlling intake to an engine, controlling exhaust, controlling an electric motor, or controlling a transmission. Prior to application of such negative torque, vehicle conditions can also be taken into account to determine if a vehicle braking event is actually desired, such as by monitoring road grade, vehicle steering, proximity of obstacles, and information from other vehicles. In addition, the driver's history of depressions and release of the accelerator can also be taken into account. Increased vehicle braking can occur prior to the driver actually applying the brake, thereby increasing the chances that adequate slowing of the vehicle will occur in time. Additionally, the methods and systems of such embodiments allow for accurate and efficient braking.

FIG. 1 is a schematic diagram illustrating a system for automated vehicle braking, according to one example of an embodiment of the present invention. In this embodiment, the system 10 includes an accelerator pedal sensor 12 that communicates with a powertrain control module 14. The accelerator pedal sensor 12 can comprise an accelerator pedal position sensor, an accelerator pedal movement sensor, or other sensor capable of monitoring the accelerator pedal or the components controlled thereby, and from which the rate of travel of the pedal can be determined or transmitted.

For example, if an accelerator pedal position sensor is utilized a sensor 12, the position of the pedal can be provided by the sensor and recorded, and a processor or circuitry within the sensor or elsewhere (e.g., in the module 14) can monitor the positions over time. Then, the rate of change of the positions of the accelerator can be determined by the processor or circuitry in order to determine how quickly the accelerator has been moved in the direction toward minimum vehicle speed. For example, if the accelerator is an accelerator pedal, and the pedal is released very quickly because the driver is going to apply high pressure to the vehicle brake to obtain quick vehicle braking, then the sensor (or processor or circuitry) would provide a signal indicating a large rate of change of the accelerator pedal in the slowing (or deceleration) direction (i.e., toward minimum speed).

Such signals from the sensor can be provided to the powertrain control module 14, which can comprise an electronic controller, a processor, circuitry, an electronic control unit, a computer, or other appropriate hardware. The control module 14 can then utilize the signals from the sensor and from other sensors 13 to determine if a rapid braking event is desired, and whether negative torque braking should be applied, how much should be applied, and by which systems. The other sensors can include road grade sensors, obstacle sensors, speed sensors, transmission sensors, steering or wheel turn sensors, or other sensors or devices which provide information regarding the conditions of the vehicle or its operation or surroundings. Additional data 11 can also be provided to the powertrain control module 14, to affect whether the negative torque braking is deployed by the module 14. Such data can include data received from other vehicles or from external detectors or road monitoring devices regarding whether an obstacle or stopping point is upcoming.

Moreover, the driver's driving history can be stored in memory 15 and provided to the powertrain control module 14. The history can store information received from the pedal sensor 12, from a brake sensor, and from other vehicle sensors regarding the driver's past braking history. For instance, when a driver releases an accelerator, the rate of release of the accelerator pedal can be determined and recorded from the pedal sensor 12, and corresponding braking information that occurs after the release can be recorded as well. For example, the amount of time between the release and the application of the brake can be stored, as can the amount of pressure applied to the brake after the release. Thus, based upon this history, the powertrain control module can control whether to apply negative torque braking in the future, such as by varying the threshold rate of release which will trigger the negative torque braking based upon the driver's history. In one embodiment, each rate of release is stored along with the corresponding amount of time that passed until the subsequent application of the brake, as well as the amount of pressure applied to the brake during that application. Using algorithms, neural networks, or fuzzy logic, it can be determined whether a high rate of accelerator release for the driver predominantly corresponds with a quick and large brake application, thereby indicating that negative torque braking may be beneficial when such high rate of accelerator releases occur in the future. Conversely, it may be determined that for a particular driver a high rate of accelerator release does not correspond with a subsequent quick or large brake application, in which case the threshold for applying negative torque braking by the module 14 for subsequent rates of accelerator release can be raised. In some circumstances, it may also be determined by the module 14 using the history 15 that even low or mid range rates of release of the accelerator pedal are followed by quick or large braking applications, in which case such a threshold can be lowered. Accordingly, the trigger for applying negative torque braking by the module can be adjusted based upon the driver history 15 stored in memory. If multiple drivers utilize the vehicle, each driver's history can be stored separately. Each driver can indicate to the vehicle (or the vehicle can detect) which driver is driving at a given point in time and the module 15 can select the correct history accordingly.

If conditions from the sensors 12 and 13 and the information from data 11 and 15 indicate that a braking event is likely to occur, the powertrain control module 14 can then implement negative torque braking event before the driver actuates the brake. In this embodiment, the negative torque braking is accomplished via commands applied to one or more components of the vehicle. For example, a command signal 27 can be provided to the engine 20 to control negative torque applied to the automatic transmission 18, and thus the negative torque applied to the drive wheels 22. This command can comprise a valve timing command, to control the timing of the intake and exhaust valves of the engine 20, to thereby increase the negative torque of the engine and assist in braking the vehicle. For example, after the compression stroke, the valves can be opened to maximize pumping losses of the engine. The intake and exhaust valves can be mechanically driven, such as via a cam shaft, or electromagnetically driven, such as via a solenoid, and the signals 27 can comprise signals of the appropriate type, format, and protocol to control the timing of such valves or the components that control them. Alternatively, the signals 27 may control an intake throttle plate, or any other limiting device in the intake path placed before the combustion chamber of the engine 20. Reducing the throttle intake can result in negative torque to assist in braking the vehicle. As another alternative, the signals 27 can vary the exhaust backpressure from the engine 20, such as via a throttling valve placed in the exhaust path. Such a valve can be mechanically or electrically driven, and the signals 27 can control the component that controls the throttle valve.

Increasing the exhaust backpressure can also increase negative torque and assist in braking the vehicle. Feedback signals 29 can be provided from the engine 20 to the module 14, such as those that indicate revolution speed, temperature and the like, such that the module 14 can regulate the negative torque of the engine. Such signals 29 can also or alternatively be utilized by the module 14 for determining whether a braking event is to occur based upon the accelerator release rate, and thus whether negative torque braking assist should be applied.

As another alternative, negative torque can be created by a speed ratio change command 25 provided to the automatic transmission 18. The speed ratio change command 25 can comprise a signal to an automatic transmission component for shifting the speed ratio of an automatic transmission 18, such that negative torque can be applied to the drive wheels 22. Such a signal 25 can be of the appropriate format and protocol to operate a throttle valve or shift valve or the like, via electronic control components. By changing the transmission to numerically higher speed ratio, the revolution speed of the engine can be increased, and thus the amount of negative torque produced by the engine is increased. Feedback signals 26 can be provided from the transmission 18 to the module 14. The signals 26 can indicate speed ratio, revolution and the like, such that the module 14 can regulate the negative torque of the transmission 18. Such signals 26 be utilized by the module 14 for determining whether a braking event is to occur based upon the accelerator release rate, and thus whether negative torque braking assist should be applied.

As a further alternative, the power control module 14 can generate a power generation command signal 23 which operates an electric motor/generator 16 (such as in the case of a hybrid vehicle or an electric vehicle). The signal 23 can control the amount of energy generated per revolution of the drive shaft coupled to the motor/generator 16. This control can be achieved by an appropriate signal to the motor/generator 16 or to the components that control the motor/generator, such as to an inverter or the like. The signal 23 can control the current or other signal applied to the motor/generator 16 to thereby increase the negative torque generated by the motor/generator which is connected to the drive wheels 22. Such negative torque can generate regenerative power for charging a hybrid vehicle battery, thereby increasing efficiency. Feedback signals 21 can be provided from the motor/generator 16 to the module 14. The signals 21 can indicate power generated, torque, and the like, such that the module 14 can regulate the negative torque of the motor/generator 16. Such signals 21 can also be utilized by the module 14 for predicting whether a braking event is to occur based upon the accelerator release rate, and thus whether negative torque braking assist should be applied.

As will be noted, the above embodiment does not require any additional components other than those that would typically be used for shift inhibition control and brake-on downshift control. Additionally, by utilizing prior history of the driver, more accurate and adaptable control can be achieved. Moreover, as a result of quicker response time to achieve the desired deceleration, the system can improve the safety of the passengers and the vehicle. The system can also increase the power generation frequency and duration of a regenerative brake system, for hybrid vehicles. The system can thus provide an unexpected level of accuracy, safety, adaptability, and efficiency, without large expense.

Figures 2A, 2B:
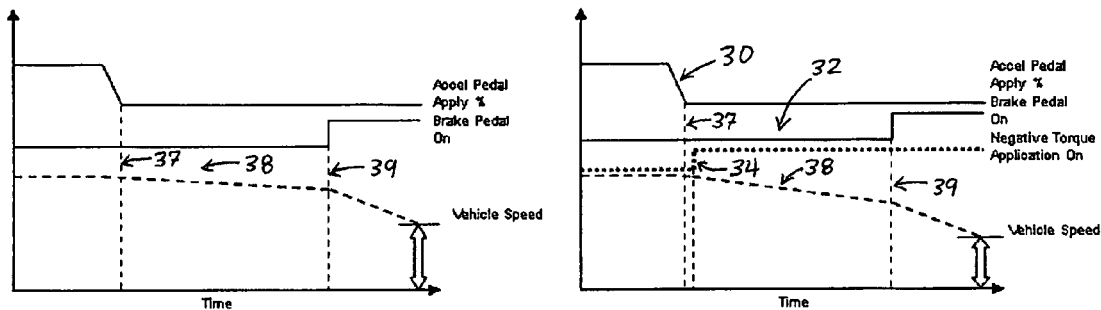
FIG. 2 is graph illustrating improved timing of braking that may be achieved according to some embodiments of the present invention.

FIG. 2 is a graph illustrating the improved timing of braking that may be achieved according to some embodiments of the present invention. For example, FIG. 2a shows the decrease in vehicle speed that may occur when a system such as the above system is not utilized. In such a case, the vehicle speed during the interim period 38 between the time 37 of the release of the accelerator and the time 39 of the application of the brake decreases at a relatively slow rate as compared with FIG. 2b. FIG. 2b illustrates the vehicle speed decrease that may be achieved using methods and systems of the present invention. In this case, after the time 37 at which the accelerator is released, a negative torque may be quickly applied at time 34. In this embodiment, the negative torque may be applied within 32 milliseconds of the detection of high rate 30 of decrease in accelerator pedal apply percentage. The high rate 30 may comprise a rate of greater than 1.5% per millisecond for example. Thus, in this example, it is seen that the vehicle can slow, during the time 38 prior to the time 39 of the brake application, at a significantly faster rate in FIG. 2b than in FIG. 2a.

Figure 3:
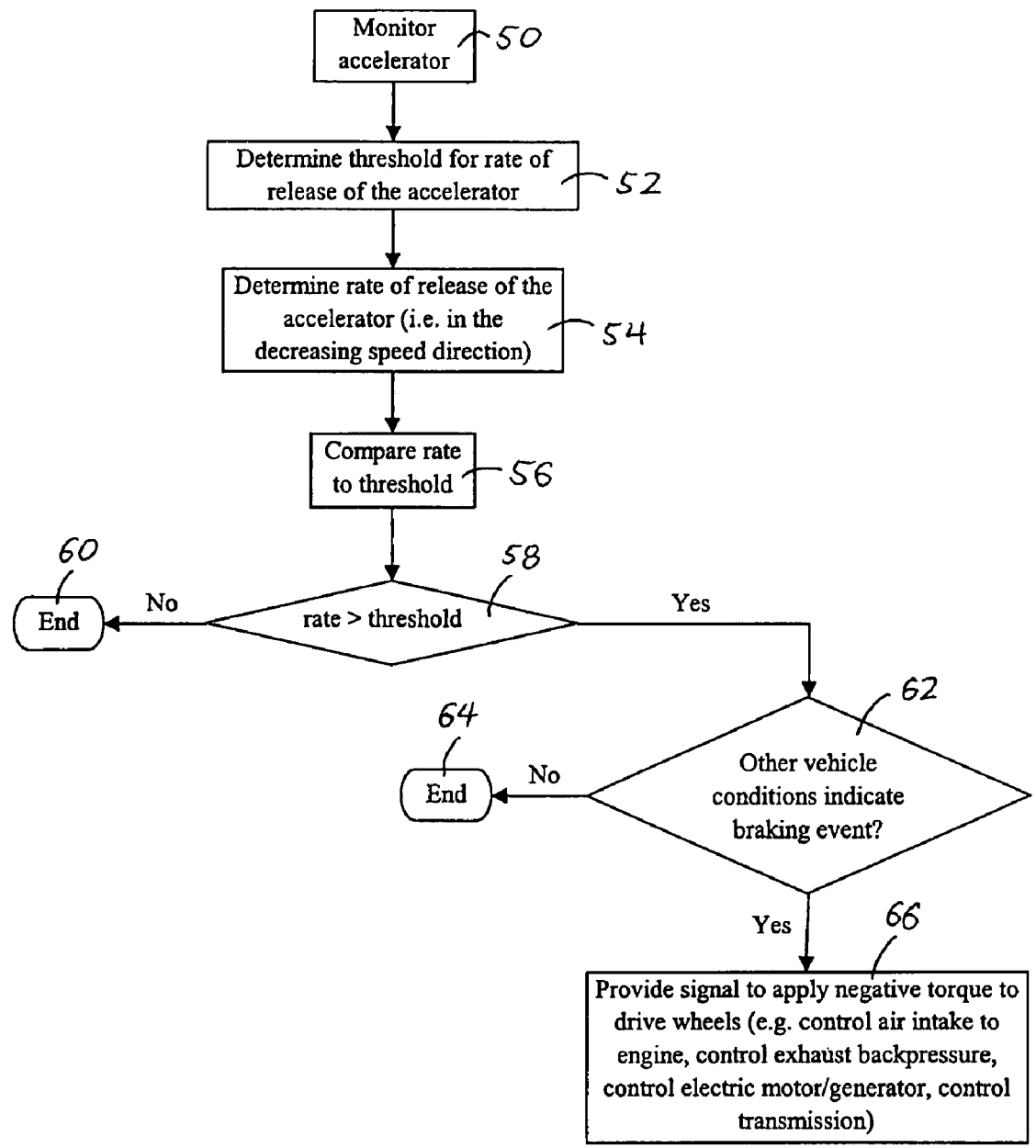
FIG. 3 is a flow diagram illustrating one illustrative embodiment of a method for automated vehicle braking, according to one embodiment.

FIG. 3 is a flow diagram illustrating one illustrative embodiment of a method for automated vehicle braking, according to one embodiment. In this embodiment, the accelerator pedal is monitored, as shown at block 50, and a threshold is determined, as shown at block 52. The threshold can be preset at a level that is typical for indicating large braking events, such as has been observed by observation. The value may also be varied based upon prior driver history and/or based upon other vehicle or surrounding conditions as indicated above. The rate of release of the accelerator release can then be determined, as shown at block 54. This can be based upon a monitored position signal (or amount of depression signal) received from the accelerator, in which case the position signal can be converted to a rate of release, indicating the rate of change of the accelerator position over time. As another alternative, an accelerator sensor may directly send the rate of release.

The rate can be compared to the threshold as shown at block 56, to determine if the rate exceeds the threshold. If it does exceed the threshold, then other vehicle conditions are also analyzed to confirm whether a braking event is forthcoming. For example, if obstacle sensors detect an upcoming object (e.g., the distance between the vehicle and the object detected is 1.5 times the distance it would take the vehicle to decelerate to a complete stop from its current speed under maximum braking), if the steering wheel is turned quickly, if the speed of the vehicle is above a certain level (example: 60 mph), if wet road conditions are detected, if the speed of the engine is above a certain level, if the grade of the road is steeper than a certain amount (example: 5% grade), if the transmission is above or below a certain speed ratio, if signals from other vehicles or objects are indicating an upcoming slowdown or low-speed caution, and/or if other such conditions are present, then it is likely that a braking application is forthcoming.

If such conditions are present, then signals are provided to apply negative torque to the drive wheels, such as by the methods described above (controlling intake to the engine, controlling exhaust backpressure, controlling a motor/generator, and/or controlling a transmission, as shown at block 66.) If such conditions are not present and/or if the rate does not exceed the threshold, then no increased negative torque is applied (as shown at blocks 60 and 64).

The above methods and algorithms can be implemented in a variety of computer or electronic systems having one or more processors, controllers, or circuitry for execution of code, instructions, programs, software, firmware, and the like for carrying out the desired tasks.

The foregoing description of the various embodiments and principles of the inventions has been presented for the purposes of illustration and description. It is not intended to be exhaustive or to limit the inventions the precise forms disclosed. Many alternatives, modifications, and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations, and variations, and have been discussed or suggested herein, as well as all others that fall within the principles, spirit, and broad scope of the various inventions as defined by the claims.

What is claimed is:

1. A method for automated braking of a vehicle, comprising:
   monitoring at least two of a road grade condition, a wet road condition or a road obstacle condition with sensors;
   monitoring the rate of travel of an accelerator pedal in a deceleration direction;
   determining if the rate of travel surpasses a threshold level;
   if the threshold level is surpassed, determining if at least two vehicle conditions are present with the sensors, wherein the at least two vehicle conditions are at least two of a road grade condition, a wet road condition, a road obstacle condition or combinations thereof; and
   if the threshold is surpassed and at least two vehicle conditions are present, braking the motor vehicle by controlling the negative torque on the drive wheels.

2. The method as recited in claim 1, wherein the negative torque on the drive wheels is controlled by varying the timing of intake and exhaust valves in an internal combustion engine.

3. The method as recited in claim 1, wherein the negative torque on the drive wheels is controlled by varying the amount of energy generated per revolution of an electric motor/generator.

4. The method as recited in claim 1, wherein the negative torque on the drive wheels is controlled by moving a transmission to a numerically higher speed ratio.

5. The method as recited in claim 1, wherein the rate of travel is monitored by sensing the positions of an accelerator pedal between points in time and calculating the rate based upon the positions.

6. The method as recited in claim 1, wherein an electronic controller carries out the determining and braking operations.

7. A system for automated braking of a vehicle, comprising:
   an accelerator position sensor configured to determine the rate of movement of a driver accelerator;
   at least two sensors configured to determine if certain vehicle conditions are present, wherein the vehicle conditions are at least two of a road grade condition, a wet road condition, a road obstacle condition or combinations thereof;
   a controller in communication with the accelerator position sensor and the at least two sensors, wherein the controller is programmed to:
   determine if the vehicle conditions are present with the at least two sensors when the rate of movement of the driver accelerator surpasses a predetermined threshold in a decreased speed direction of the driver accelerator; and
   generate a control signal configured to apply negative torque to the drive wheels of the vehicle when the rate of movement of the driver accelerator surpasses a predetermined threshold in a decreased speed direction of the driver accelerator and at least two of the vehicle conditions are present.

8. The system as recited in claim 7, wherein the controller and the accelerator position sensor are integral.

9. The system as recited in claim 7, wherein the control signal comprises at least one of an intake valve control signal, an exhaust valve control signal, a motor control signal, and a transmission control signal.

10. The method of claim 1 wherein the road grade condition is present when a grade of the road is greater than a pre-determined grade.

11. The method of claim 10 wherein the pre-determined grade is 5%.

12. The method of claim 1 wherein the road obstacle condition is present when a distance between the vehicle and an object detected in the path of the vehicle is greater than 1.5 times a stopping distance of the vehicle under maximum braking at a current speed of the vehicle.

13. The system of claim 7 wherein the at least two sensors include an obstacle sensor.

14. The system of claim 13 wherein the obstacle sensor is configured to determine when a distance between the vehicle and an object detected in the path of the vehicle is greater than 1.5 times a stopping distance of the vehicle under maximum braking at a current speed of the vehicle.

15. The system of claim 7 wherein the at least two sensors include a road grade sensor configured to determine if a grade of the road is greater than a pre-determined grade.

16. The system of claim 7 further comprising a vehicle component operatively coupled to the controller, wherein the vehicle component receives the control signal from the controller and affects the torque on the drive wheels based on the control signal received from the controller.

17. The system of claim 16 wherein the vehicle component comprises an internal combustion engine, and wherein the control signal controls the timing of intake and exhaust valves of the internal combustion engine.

18. The system of claim 16 wherein the vehicle component comprises a valve in an exhaust path of the vehicle for controlling a backpressure of exhaust and the control signal controls a position of the valve.

19. The system of claim 16 wherein the vehicle component comprises a transmission of the vehicle and the control signal shifts the transmission to a numerically higher speed ratio.

20. The system of claim 16 wherein the vehicle component comprises a motor/generator coupled to a drive shaft and the control signal controls an amount of energy generated per revolution of the drive shaft.

* * * * *